No. 723,593. PATENTED MAR. 24, 1903.
G. A. ENSIGN.
CLUTCH MECHANISM.
APPLICATION FILED DEC. 9, 1902.
NO MODEL.
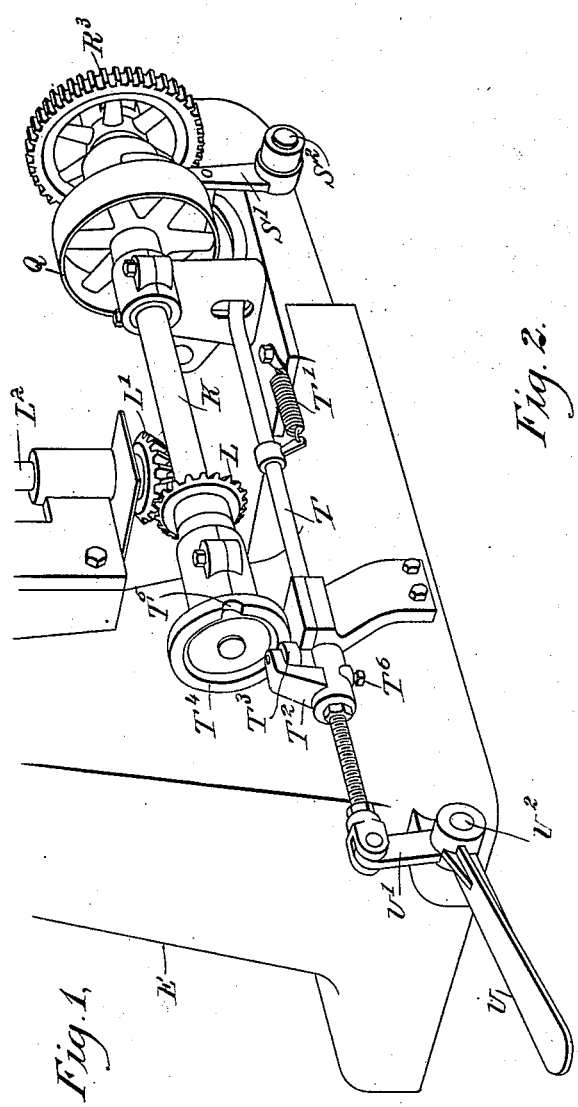
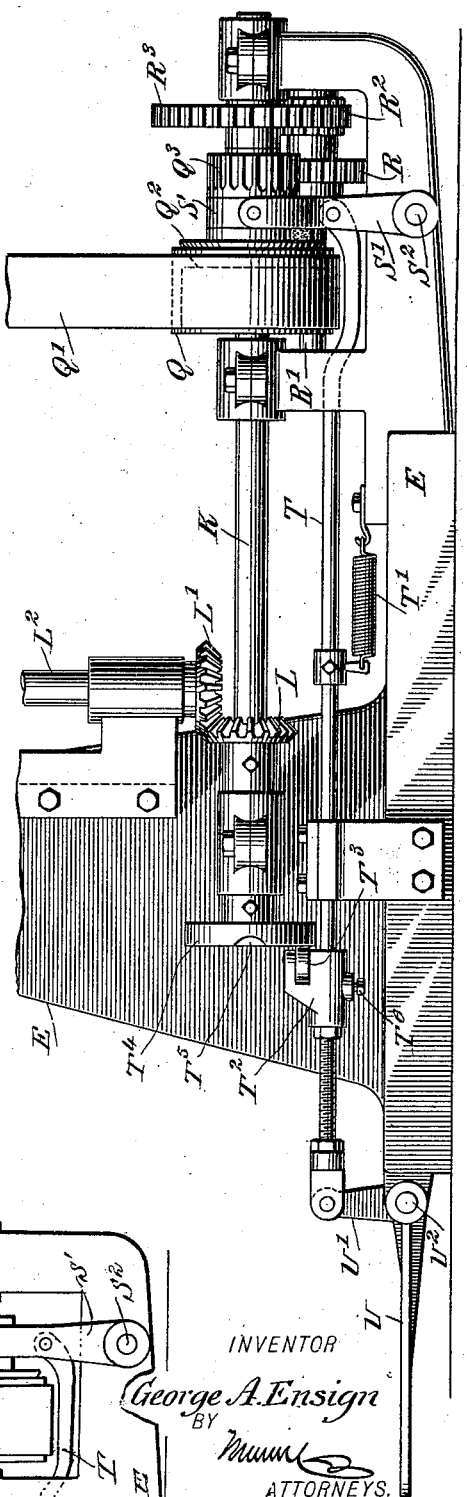
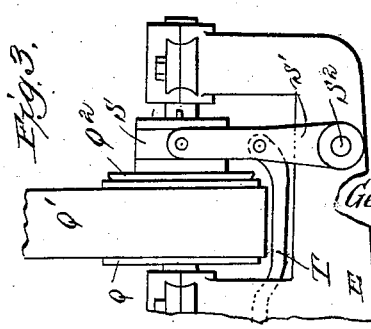
WITNESSES:
Edward Thorpe
INVENTOR
George A. Ensign
BY
ATTORNEYS.

UNITED STATES PATENT OFFICE.

GEORGE A. ENSIGN, OF DEFIANCE, OHIO, ASSIGNOR TO DEFIANCE MACHINE WORKS, OF DEFIANCE, OHIO.

CLUTCH MECHANISM.

SPECIFICATION forming part of Letters Patent No. 723,593, dated March 24, 1903.

Original application filed October 9, 1902, Serial No. 126,467. Divided and this application filed December 9, 1902. Serial No. 134,519. (No model.)

*To all whom it may concern:*

Be it known that I, GEORGE A. ENSIGN, a citizen of the United States, and a resident of Defiance, in the county of Defiance and State of Ohio, have invented a new and Improved Clutch Mechanism, of which the following is a full, clear, and exact description, this being a division of the application for Letters Patent of the United States, Serial No. 126,467, filed by me October 9, 1902, for a felly compressing and boring machine.

The object of the invention is to provide a new and improved clutch mechanism which is simple and durable in construction, very effective in operation, adapted to be readily thrown in gear by the operator whenever it is desired to do so, and arranged to automatically throw the clutch out of gear after one revolution is made by the main or driving shaft.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a perspective view of the improvement. Fig. 2 is a side elevation of the same, and Fig. 3 is a detail view illustrating another form of the improvement.

The main or driving shaft K is journaled in suitable bearings and serves to transmit power to the machine or other device on which the clutch mechanism is to be used—for instance, a felly compressing and boring machine such as referred to in the application for Letters Patent above mentioned. For transmitting the power this shaft K is, for instance, provided with a bevel gear-wheel L, in mesh with a bevel gear-wheel L', secured on another shaft $L^2$, forming part of the machine; but I do not limit myself to this particular construction, as it is evident that it may be varied to suit the construction of the machine on which the device is applied. In order to drive the shaft K, a friction clutch-pulley Q is mounted to rotate loosely on the said shaft, and the said pulley is connected by a belt Q' with other machinery. A friction-clutch $Q^2$ is adapted to engage the clutch-pulley Q, and the hub of the said friction-clutch $Q^2$ is mounted to rotate loosely on the shaft K and is provided with a gear-wheel $Q^3$, in mesh with a gear-wheel R, secured on a back shaft R', carrying a pinion $R^2$, in mesh with a gear-wheel $R^3$, secured on the shaft K, so that when the friction-clutch $Q^2$ is in frictional engagement with the clutch-pulley Q then the rotary motion of the latter is transmitted to the friction-clutch $Q^2$, which by the gear-wheels $Q^3$, R, and $R^3$ rotates the shaft K.

As shown in Fig. 3, the back gear just described may be omitted and the clutch Q mounted to slide on and to turn with the shaft K, so that when the friction-clutch $Q^2$ is in frictional engagement with the clutch-pulley Q then the rotary motion of the latter is transmitted to the friction-clutch $Q^2$, which then rotates the shaft K directly. The hub of the friction-clutch $Q^2$ is provided in either case with a shifting-collar S, engaged by a shifting-fork S', fulcrumed at $S^2$ on the bed E of the machine and pivotally connected with a rod T, mounted to slide in a bearing on the said bed. A spring T' presses the rod T in the direction of its length to normally hold the shifting-fork S' in a rearmost position to disengage the friction-clutch $Q^2$ from the friction clutch-pulley Q. On the rod T is secured a head $T^2$, carrying a friction-roller $T^3$, traveling on the face of a cam in the form of a disk $T^4$, secured on the forward end of the shaft K, and in the face of the said friction-disk $T^4$ is formed a notch or recess $T^5$ (see Fig. 1) for the friction-roller $T^3$ to drop in to allow the spring T' to draw the rod T rearwardly and hold the friction-clutch $Q^2$ out of mesh with the friction-pulley Q. The forward end of the rod T is pivotally connected with the vertical member U' of a treadle U, fulcrumed at $U^2$ on the bed E and adapted to be pressed by the operator to move the rod T forward against the tension of the spring T' to disengage the friction-roller $T^3$ from the notch $T^5$. Now when the rod T is moved forward, as described, then the friction-clutch $Q^2$ is moved in mesh with the friction-pulley Q to cause rotation of the shaft K by the back gearing above described and driven from the pulley Q. It is only necessary for the operator to press the treadle U downward until the shaft K has turned sufficiently to bring the notch $T^5$ out of alinement with the roller $T^3$, and when the operator then releases the treadle U the friction-roller $T^3$, traveling on the face of the disk $T^4$, holds the rod T in a forward position to insure driving of the shaft K by the gearing described until the notch $T^5$ is reëngaged by the friction-roller $T^3$, so that the spring $T'$ draws the shaft T rearwardly to move the friction-clutch $Q^2$ out of engagement with the friction clutch-pulley Q. The rotation of the shaft K then ceases. The head $T^2$, carrying the friction-roller $T^3$, is held adjustably on the shifting-rod T and is fastened thereto, after the desired adjustment is made, by a set-screw $T^6$. When the friction-roller $T^3$ is in engagement with the notch $T^5$, then the shaft K is at a standstill—that is, the friction-clutch $Q^2$ is out of engagement with the friction clutch-pulley Q. Now when the operator presses the treadle U then the shifting-rod T is pulled forward to move the friction-roller $T^3$ out of engagement with the said notch and at the same time impart a forward swinging motion to the shifting-fork $S'$ to move the friction-clutch $Q^2$ in frictional engagement with the clutch-pulley Q. The shaft K is then driven as described, and when the shaft K has made one revolution and the notch $T^5$ has again reached the friction-roller $T^3$ then the rod T is moved rearwardly by the action of its spring $T'$ to disconnect the friction-clutch $Q^2$ from the friction-pulley Q and stop the rotation of the shaft K.

The device is very simple and durable in construction and is not liable to get easily out of order, and by having the head $T^2$ adjustable on the shifting-rod T it is evident that any wear between the surfaces of the friction-clutch $Q^2$ and the pulley Q can be readily taken up to insure a proper working of the mechanism at all times.

Having thus described my invention, I claim as new and desire to secure by Letters Patent—

1. A clutch mechanism for a power-transmitting shaft, comprising a clutch-pulley mounted to rotate loosely on the shaft, a clutch for engagement with the said clutch-pulley and for rotating the said shaft, an operating device for the said clutch, comprising a shifting-fork for the clutch, a spring-pressed rod connected with the shifting-fork and carrying a friction-roller, a notched disk secured on the said shaft and engaged by the said friction-roller, and a treadle fulcrumed on the bed of the machine and having a vertical member pivotally connected with the said spring-pressed rod, as set forth.

2. A clutch mechanism, comprising a power-transmitting shaft, a driving device for the said shaft, a clutch for connecting the driving device with the said shaft, and an operating device for the said clutch comprising a shifting-fork, a spring-pressed rod mounted to slide and connected with the shifting-fork, a cam on the power-transmitting shaft and comprising a disk having a recess in its face, a device on the rod carrying a friction-roller adapted to engage the face of said disk to hold the clutch in active position against the tension of the spring, and to engage the recess in the disk to permit the spring to act to move the clutch to inactive position, and means connected with the rod for moving the same against the tension of the spring to disengage the said device from the recess in the disk and move it into position to engage the face of the disk, as set forth.

3. A clutch mechanism, comprising a power-transmitting shaft, a driving device for the said shaft, a clutch for connecting the driving device with the said shaft, a shifting-fork for the said clutch fulcrumed on the bed of the machine, a rod mounted to slide in bearings on the said bed and pivotally connected at one end with the said shifting-fork, a spring for normally holding the shifting-fork in a rearmost postion to disengage the clutch, a treadle fulcrumed on the bed of the machine and pivotally connected with the other end of the rod for moving the same and the shifting-fork against the tension of the spring to carry the clutch to active position, an adjustable device carried by the said rod, and a cam mounted to turn and engaged by said adjustable device on the rod, as set forth.

4. The combination with the bed of the machine, the power-transmitting shaft journaled in bearings carried by the bed of the machine, and a driving device for the said shaft, of a clutch for connecting the driving device with the said shaft, and an operating device for the said clutch, comprising a shifting-fork for the clutch fulcrumed at its lower end on the bed of the machine, a spring-pressed rod located below the power-transmitting shaft and mounted to slide in bearings carried by the bed of the machine, the said rod being connected at one end with the shifting-fork, the other end of said rod being screw-threaded, a head secured on the screw-threaded portion of the rod and carrying a roller, a disk secured on the end of the power-transmitting shaft and engaged by the said roller, the disk having a notch in its outer face extending through the periphery, and means connected with the screw-threaded end of the rod, for moving the same against the tension of the spring, as set forth.

In testimony whereof I have signed my name to this specification in the presence of two subscribing witnesses.

GEORGE A. ENSIGN.

Witnesses:
GEORGE W. DEATRICK,
JOS. BAUER.